United States Patent
Clark

(10) Patent No.: US 7,438,964 B2
(45) Date of Patent: Oct. 21, 2008

(54) ADHESIVE CORD COVER

(76) Inventor: Kim Marie Clark, 544 Posey St., Harahan, LA (US) 70123

( * ) Notice: Subject to any disclaimer, the term of this patent is extended or adjusted under 35 U.S.C. 154(b) by 82 days.

(21) Appl. No.: 10/634,204

(22) Filed: Aug. 5, 2003

(65) Prior Publication Data

US 2005/0031821 A1    Feb. 10, 2005

(51) Int. Cl.
- B32B 9/00    (2006.01)
- B32B 23/02   (2006.01)
- B32B 3/00    (2006.01)
- F16L 11/00   (2006.01)
- B65D 65/02   (2006.01)

(52) U.S. Cl. .................. 428/40.1; 428/41.8; 428/42.1; 428/192; 428/194; 428/201; 428/202; 138/123; 138/128; 150/154; 150/901

(58) Field of Classification Search ........... 428/40.1, 428/41.8, 42.1, 192, 194, 201, 202; 138/123, 138/128; 150/154, 901

See application file for complete search history.

(56) References Cited

U.S. PATENT DOCUMENTS

| | | | |
|---|---|---|---|
| 3,038,558 A | 6/1962 | Plummer | |
| 3,654,049 A | 4/1972 | Ausnit | |
| 3,716,733 A | 2/1973 | Keith et al. | |
| 3,866,649 A | 2/1975 | Bringmann | |
| 3,884,495 A * | 5/1975 | Petock | 280/87.041 |
| 3,906,129 A | 9/1975 | Damois | |
| 4,389,440 A | 6/1983 | Keith | |
| 4,795,190 A * | 1/1989 | Weightman et al. | 280/808 |
| 4,939,778 A | 7/1990 | Tomberlin | |
| 4,954,939 A | 9/1990 | Hutchins | |
| 4,979,614 A | 12/1990 | Ruhaut | |
| 5,016,859 A | 5/1991 | Zimmer et al. | |
| 5,099,889 A * | 3/1992 | Ratzlaff | 138/110 |
| 5,130,496 A | 7/1992 | Jenkins | |
| 5,190,533 A * | 3/1993 | Blackburn | 604/367 |
| 5,293,501 A | 3/1994 | Bennett et al. | |
| 5,397,243 A | 3/1995 | MacMurdo, Sr. | |
| 5,569,229 A * | 10/1996 | Rogers | 604/385.09 |
| 5,800,762 A | 9/1998 | Bethel | |
| 5,861,579 A | 1/1999 | Bickersteth et al. | |
| 5,869,159 A * | 2/1999 | Padilla | 428/40.1 |
| 5,895,288 A | 4/1999 | Nelson | |
| 5,964,252 A * | 10/1999 | Simmons et al. | 138/149 |
| 5,979,322 A * | 11/1999 | DeMoore et al. | 101/401.1 |
| 6,018,874 A | 2/2000 | Todd | |
| 6,233,796 B1 | 5/2001 | van Wassenhove et al. | |
| D445,093 S | 7/2001 | Staskey | |

* cited by examiner

*Primary Examiner*—Victor S Chang
(74) *Attorney, Agent, or Firm*—Stephen M. Nipper; Dykas, Shaver & Nipper, LLP

(57) ABSTRACT

An adhesive cord cover for enveloping a cord, such as an electrical cord or chandelier chain. The adhesive cord cover is formed from a lengthwise strip of fabric. A pressure sensitive adhesive is attached to the fabric strip, preferably along a first lengthwise edge. The pressure sensitive adhesive is positioned and configured to allow a fastening side of the pressure sensitive adhesive to be selectively adhered to the lengthwise strip of fabric to thereby form a tubular configuration for enveloping a cord. The pressure sensitive adhesive is preferably an adhesive transfer tape. The transfer tape preferably has a removable liner on the fastening side. The removable liner assists in preserving the adhesive properties of the pressure sensitive adhesive prior to use. The pressure sensitive adhesive transfer tape is preferably a continuous strip that extends substantially along the entire length of the piece of fabric.

9 Claims, 2 Drawing Sheets

ADHESIVE CORD COVER

CROSS REFERENCE TO RELATED APPLICATIONS

Not applicable.

STATEMENT REGARDING FEDERALLY SPONSORED RESEARCH OR DEVELOPMENT

Not applicable

REFERENCE TO A MICROFICHE APPENDIX

Not applicable

FIELD OF THE INVENTION

The present invention relates generally to decorative covers for linear objects such as electrical cords, chandelier chains, and pipes and methods for their use and, more specifically, to a decorative cord cover that includes a pressure sensitive adhesive strip for facilitating deployment of the cord cover around such objects.

BACKGROUND OF THE INVENTION

Generally, electrical fixtures, appliances, and the like for use in the home or elsewhere are supplied power through an electrical cord extending from an electrical outlet to the fixture. Often, the electrical fixture, such as a lamp, radio or other small appliance is positioned within the room, leaving the electrical cord visible to persons in the room. The electrical cord is not aesthetically pleasing. Similar aesthetic problems are encountered with chandelier chains, which extend downward from a ceiling and include an electrical cord, which is typically intertwined with the chain. Additionally, multiple cords may become entangled with one another. There is thus a need for devices that accent the appearance of plug in electrical cords and coordinate the cord with the room's decor, and which can also be used to minimize or eliminate tangling of multiple cords. The foregoing problems occur not only with electrical cords, but also with other types of plug-in cords and lines that carry data, such as telephone lines, coaxial cables, and the like. As used herein, the term "electrical cord" shall mean and include all such lengthwise cords, lines and cables that are used in home and office settings.

Removable cylindrically shaped covers have been used to cover a multitude of devices including cart handles, insulating covers for fluid containers, and protective jackets for conductors, chandelier chains and the like. See for example U.S. Pat. Nos. 3,866,649; 3,654,049; 3,906,129; and 3,038,558. These applications disclose covers secured around an item by a fastening device such as a zipper, extruded fastener or hook-and-loop type fastening material. All of these examples are similar in that the secured cover can be removed by simply unfastening the fastening device. In each case, the device includes a pair of matching fastening means which adhere to one another.

The present invention improves particularly upon U.S. Pat. No. 4,954,939 (Hutchins), which discloses an adjustable and removable chandelier cord cover. The Hutchins cover is made of a lengthwise strip of fabric material that has first and second engaging edges. A first strip of fastening material is fixedly secured to one of the engaging edges and a second strip of fastening material is fixedly secured to the other engaging edge. The two strips of fastening material engage one another when the two strips are joined together. The specification discusses the configuration and location of the two strips at column 1, lines 45-59, column 2, lines 43-57 and column 3, lines 1-15. Throughout the specification, one of the strips of fastening materials is described as having "hooks" while the other strip of fastening material is described as having "loops." The specification further notes that a typical example of material suitable for this purpose is that sold under the trademarks VELSTICK and VELCRO. Column 3, lines 7-9. Nowhere in the specification is there any suggestion that the second strip can be eliminated.

Pressure sensitive adhesive transfer tapes or double stick tapes are widely used to bond two surfaces together. One of the advantages of using transfer tapes is that they are easier to dispense and apply than liquid adhesives, which must be dispensed from a container.

As far as the inventor can determine, no attempts have been made to apply pressure sensitive adhesives to cord covers. There is thus a need for a cord cover having the following characteristics and advantages over the prior art.

OBJECTS AND SUMMARY OF THE INVENTION

It is an object of the invention to provide a cord cover that can be readily applied around a cord, such as an electrical cord, a cable, a telephone line, or a chandelier chain.

It is another object of the invention to provide a cord cover that is easier and less expensive to manufacture than prior art cord covers.

It is yet another object of the invention to provide a cord cover that can be adjusted to various diameters along its length, so as to cover an object that varies in diameter along its length.

The invention is an adhesive cord cover device for use in enveloping a linear object such as an electrical cord, a cable, telephone lines, a chandelier chain, a rod, a pipe, or the like. The cord cover is used primarily for decorative purposes. The adhesive cord cover is formed from a lengthwise strip of fabric. The lengthwise strip of fabric has a first widthwise edge, a second widthwise edge, a first lengthwise edge, a second lengthwise edge, an interior side and an exterior side.

A pressure sensitive adhesive is attached to the fabric strip. The pressure sensitive adhesive has a base side and a fastening side. The base side of the pressure sensitive adhesive is adhered to the fabric strip. The pressure sensitive adhesive is positioned and configured to allow the fastening side of the pressure sensitive adhesive to be selectively adhered to the lengthwise strip of fabric to thereby form a tubular configuration for enveloping the linear object. The tubular configuration has a first open end formed along the first widthwise edge and a second open end formed along the second widthwise edge. In the preferred embodiment, a base side of the pressure sensitive adhesive is adhered to the interior side of the strip of fabric substantially along the first lengthwise edge. In some applications, it is preferable to adhere the fastening side of the adhesive to the exterior side of the strip of fabric substantially along the second lengthwise edge. By the fastening the lengthwise edges together, the cord cover is provided with a lengthwise opening having a maximum inner diameter. In other applications it is preferable to vary the inner diameter of the tubular configuration at different locations along the length of the fabric strip, so as to accommodate irregular objects.

The pressure sensitive adhesive is preferably an adhesive transfer tape. The transfer tape preferably has a removable liner on the fastening side. The removable liner assists in preserving the adhesive properties of the pressure sensitive adhesive prior to use. The pressure sensitive adhesive transfer tape is preferably a continuous strip that extends substantially along the entire length of the piece of fabric.

PREFERRED EMBODIMENTS OF THE INVENTION

In the following detailed description of the preferred embodiments, reference is made to the accompanying drawings which form a part hereof, and in which are shown by way of illustration specific embodiments in which the invention may be practiced. It is to be understood that other embodiments maybe utilized and structural changes maybe made without departing from the scope of the present invention.

Figure 1:
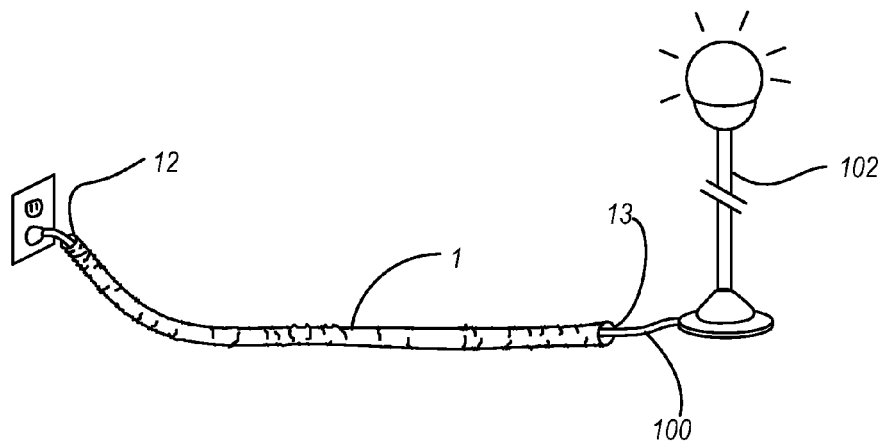
FIG. 1 is a side view of one preferred embodiment of the adhesive cord cover of the invention, showing the device in a closed configuration enveloping an electrical cord.
Figure 3:
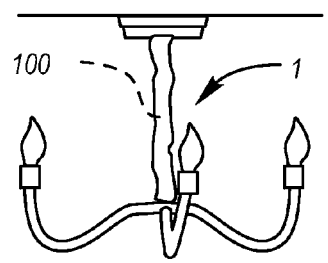
FIG. 3 is a side view of one preferred embodiment of the adhesive cord cover of the invention, showing the device in a closed configuration enveloping the chain and cord of a chandelier.

As shown in FIGS. 1 and 3, the invention is an adhesive cord cover device 1 for use in enveloping a linear object 100, such an electrical cord, a cable, telephone lines, a chandelier chain, a rod, a pipe, or the like, primarily for decorative purposes. Although the cord cover 1 is designed primarily for covering cords, it can also be used to cover other linear objects such as pipes, ceiling fan poles, curtain rods, shower curtain rods, closet rods, sides of bed frames and recliner chair handles.

Figure 2:
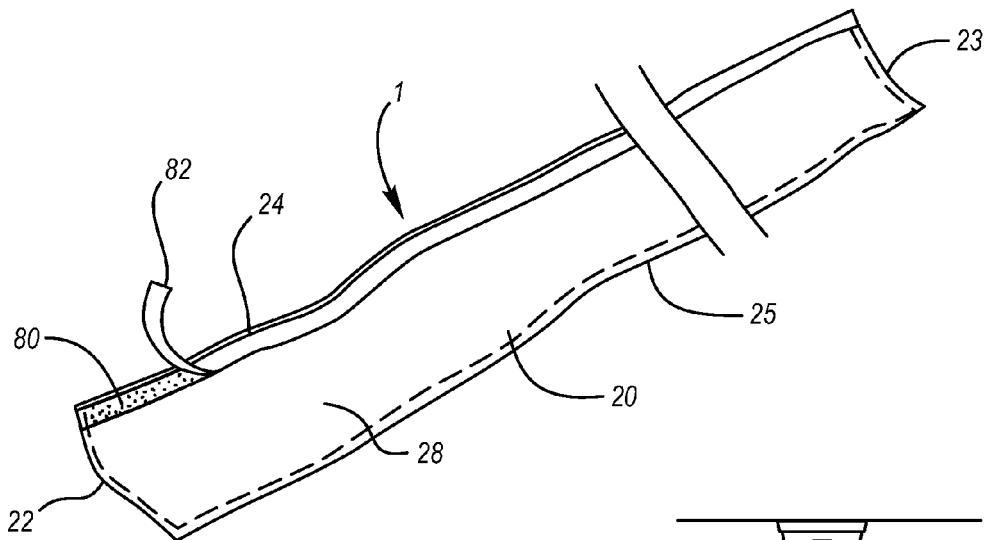
FIG. 2 is a perspective view of one preferred embodiment of the adhesive cord cover of the invention in an open configuration.

As shown in FIG. 2, the adhesive cord cover 1 is formed from a lengthwise strip of fabric 20. The lengthwise strip of fabric 20 has a first widthwise edge 22, a second widthwise edge 23, a first lengthwise edge 24, a second lengthwise edge 25, an interior side 28 and an exterior side 29. Prior to use, the device 1 is in the open configuration shown in FIGS. 2 and 4. During use, the device 1 is configured into a closed tubular configuration, as shown in FIGS. 1, 3 and 5, using a pressure sensitive adhesive 80.

Figure 4:
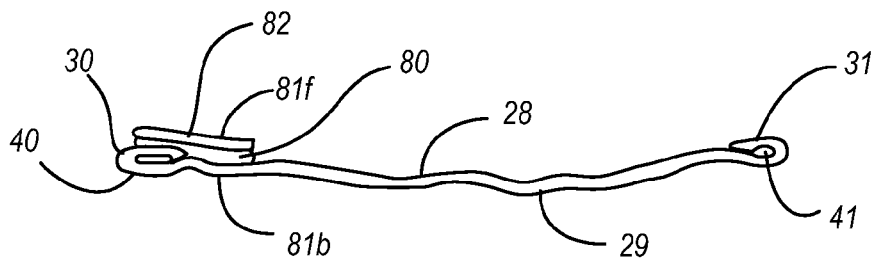
FIG. 4 is a side view of one preferred embodiment of the adhesive cord cover of the invention, showing the device in an open configuration and featuring details
Figure 5:
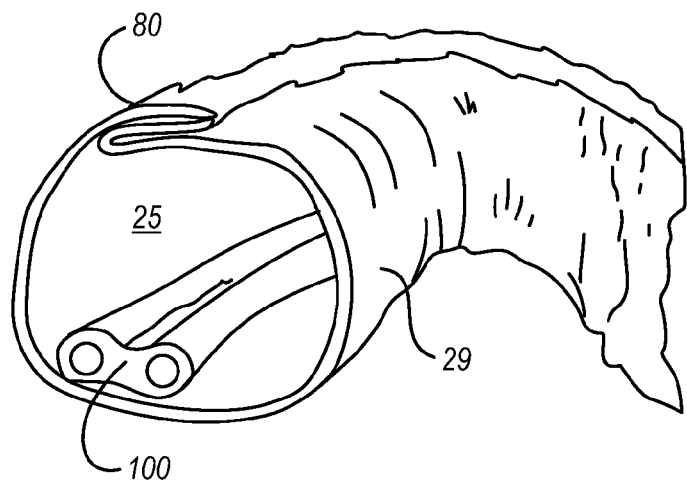
FIG. 5 is cross-section perspective view of one preferred embodiment of the adhesive cord cover of the invention in a closed configuration, showing the use of the adhesive to form a tube.

As shown in FIG. 4, a pressure sensitive adhesive 80 is attached to the fabric strip 20. The pressure sensitive adhesive 80 has a base side 81B and a fastening side 81F. As shown in FIG. 4, the base side 81B of the pressure sensitive adhesive 80 is adhered to the fabric strip 20, even when the device 1 is in an open configuration. The pressure sensitive adhesive 80 is positioned and configured to allow the fastening side 81F of the pressure sensitive adhesive 80 to be selectively adhered to the lengthwise strip of fabric 20 to thereby form a tubular configuration for enveloping a linear object 100, such as a cord. As shown in FIG. 1, the tubular configuration has a first open end 12 formed along the first widthwise edge 22 and a second open end 13 formed along the second widthwise edge 23.

Figure 6:
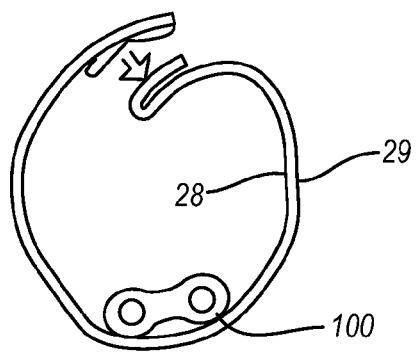
FIG. 6 is a cross-section frontal view of one preferred embodiment of the adhesive cord cover of the invention, showing formation of the closed configuration.

In the preferred embodiment shown in FIG. 4, the base side 8 1B of the pressure sensitive adhesive 80 is adhered to the interior side 28 of the strip of fabric 20 substantially along the first lengthwise edge 24. By placing the adhesive 80 along the edge, a larger width of fabric is available to form the closed tube. However, the base side 81B of the adhesive 80 can be adhered to the exterior side 29 of the fabric 20 or a selected distance from the first lengthwise edge 24 without departing from the spirit and scope of the invention. Likewise, as shown in FIGS. 5 and 6, it is preferable to adhere the fastening side 81F of the adhesive 80 to the exterior side 29 of the strip of fabric 20 substantially along the second lengthwise edge 25. By the fastening the lengthwise edges 24, 25 together, the cord cover is provided with a lengthwise opening 25 having a maximum inner diameter. However, the fastening side 81F of the adhesive 80 can be adhered to the interior side 28 of the fabric 20 or a selected distance from the second lengthwise edge 25 without departing from the spirit and scope of the invention.

The pressure sensitive adhesive 80 may be reusable for a limited number of times, which allows the cord cover 1 to be opened and reused. Once the adhesive 80 becomes fatigued to the point that it no longer has sufficient adhesive strength to achieve the purpose of the invention, the adhesive 80 can be replaced with a new adhesive 80.

The pressure sensitive adhesive 80 is preferably an adhesive transfer tape. Adhesive transfer tape 80 has the advantage of being inexpensive, easy to work with, easy to apply during the manufacturing process, and relatively easy to remove and replace with a new strip of transfer tape. It is also easy to overlay a new strip of transfer tape 80 over an older fatigued strip of transfer tape 80. Additionally, as shown in FIGS. 2 and 4, the transfer tape 80 preferably has a removable liner 82 on the fastening side 81F. The removable liner 82 assists in preserving the adhesive properties of the pressure sensitive adhesive 80 prior to use. As shown in FIG. 2, the liner 82 is selectively removable from the fastening side 81F of the transfer tape 80 to thereby allow the fastening side 81F of the transfer tape 80 to be selectively adhered to the strip of fabric 20 to form the closed tubular configuration. The inventor's experiments indicate that the two most effective transfer tapes for use in the invention are 3M® VHB® 9485 transfer tape and SCOTCH® 908 adhesive transfer tape.

As shown in FIG. 2, the pressure sensitive adhesive transfer tape 80 is preferably a continuous strip that extends substantially along the entire length of the piece of fabric 20. A continuous strip is easier to apply to the cord cover 1 during manufacture, and ensures a continuous, and thus stronger, seal when the cord cover 1 is in a closed tubular configuration. However, the pressure sensitive adhesive 80 can also be discontinuous, such as multiple short strips. The use of a discontinuous layout for the adhesive 80 reduces the cost of adhesive material. Additionally, some users may prefer to have multiple adhesive sections/areas 80 that are covered with a liner 82, such that the liner 82 can be removed from each section of adhesive 80 just prior to using the adhesive 80 in that particular section. Alternatively, the adhesive 80 could be applied in the form of a glue that is extruded or painted onto the fabric 20, provided that the glue adhesive retains its adhesive properties over an extended period of time.

Unlike the prior art, the adhesive cord cover 1 of the invention does not have two strips of fastening material that are configured to engage one another and which are secured on opposite edges of the fabric material (e.g. VELCRO, snaps). Instead, the cord cover 1 of the invention uses one fastening means 80 that can be selectively adhered directly to the fabric of the cord cover 1 in order to form a closed tubular configuration. One of the advantages of this configuration over the prior art is that it allows the cord cover 1 to be adjusted to fit different diameters, since closure is not dependent upon matching up two separate strips of fastening material. Another advantage over the prior art is that the cord cover 1 can be adjusted to different diameters along its length, with the diameters selected according to variations in the linear object 100. Thus, if the linear object 100 tapers or bulges at certain locations, the fastening means 80 can be selectively adhered to the cord cover 1 so as to provide a close fit along the contour of the object 100. Another advantage over the prior art is that when the cord cover 1 is set in a vertical or partially vertical orientation, an upper portion of the tubular configuration can be selectively provided with an inner diameter smaller than a portion of the linear object 100 (e.g. an upper link of a chandelier chain), such that the small diameter rests on the object and prevents the cord cover 1 from slipping downward along the linear object 100.

The adhesive cord cover 1 is preferably about six inches wide. When a six inch wide cord cover 1 is in the closed configuration of FIG. 5, the cord cover 1 has an inner diameter of about two inches, which is sufficient to encase the majority of cords, and also allows room to fit multiple cords within the same cord cover 1. The cord cover 1 can be made from a wider piece of fabric 20, particularly for office applications, where it may be desirable to run seven or more chords through the cord cover 1.

Lengthwise elastic strips can be used to give the cord cover 1 a gathered appearance. As shown in FIG. 4, a first elastic strip 40 is hemmed along the first lengthwise edge 24 of the strip of fabric 20, while a second elastic strip 41 is hemmed along the second lengthwise edge 25 of the strip of fabric 20. The first and second elastic strips 40, 41 together provide the strip of fabric 20 with a gathered configuration. Placing the elastic strips 40, 41 along the lengthwise edges 24, 25 provides an economical method of creating a gathered appearance. The cover 1 can be made without the elastic and gathers so as to give a smoother appearance. A smoother appearance works particularly well with narrower cords, such as electrical, data or telecom wire, where gathering may become bulky.

The lengthwise piece of fabric 20 can be readily cut to create a cord cover 1 of a desired length. For example, if the cord cover 1 is ten feet long but only two feet of cord cover are required to cover a certain cord, the cord cover 1 can be readily cut into separate sections of two feet and eight feet long, respectively. The remaining eight foot piece of cord cover 1 can be used to cover a longer cord, or can be cut into shorter pieces. The fabric 20 and the adhesive material 80 can be cut with conventional scissors.

The cord cover 1 is preferably constructed from a pliable material, such as linen, muslin, cotton, silk (e.g. dupioni silk), velvet (preferably stretch), satin, nylon, polyester, rayon, leather or vinyl. Materials that include lycra (e.g. 10 percent lycra) have desirable stretching qualities for use in the invention.

Although the adhesive cord cover 1 is intended primarily as a decorative cover, it serves utilitarian functions as well. The cord cover 1 serves to hold a plurality of electrical cords together, and provides an additional degree of protection to the enclosed electrical cords. Additionally, adhesive cord covers 1 can be manufactured more simply and inexpensively than prior art covers that incorporate a two-part fastening mechanism.

In operation, the invention is used by providing a cord cover 1 having the foregoing characteristics, including a pressure sensitive adhesive 80 adhered to the strip of fabric 20, preferably along the first lengthwise edge 24. The interior side 28 of the strip of fabric 20 is placed along a cord 100. The second lengthwise edge 25 of the strip of fabric is brought into contact with the pressure sensitive adhesive 80, and pressure is then applied to the fabric to thereby attach the second lengthwise edge 25 of the strip of fabric 20 to the adhesive 80 to form a tube around the cord 100. The tubular configuration has a first open end 12 formed along the first widthwise edge 22 and a second open end 13 formed along the second widthwise edge 23, which allows the cord to exit through both ends of the tube.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A system for decoratively covering a linear object, said system comprising:
    a linear object, said linear object selected from the group consisting of electrical cords, chandelier chains and pipes;
    a lengthwise strip of fabric, said lengthwise strip of fabric having a first widthwise edge, a second widthwise edge, a first lengthwise edge, a second lengthwise edge, an interior side and an exterior side,
    a first elastic strip hemmed along said first lengthwise edge of said strip of fabric, and a second elastic strip hemmed along said second lengthwise edge of said strip of fabric, said first and second elastic strips together providing said strip of fabric with a gathered configuration,
    a strip of pressure sensitive adhesive transfer tape, said pressure sensitive adhesive transfer tape having a base side and a fastening side, said base side of said pressure sensitive adhesive adhered to said interior side of said strip of fabric substantially along said first lengthwise edge, and
    a liner, said liner covering said fastening side of said pressure sensitive adhesive transfer tape to thereby assist in preserving adhesive properties of said pressure sensitive adhesive transfer tape, said liner selectively removable from said fastening side of said transfer tape to thereby allow said fastening side of said transfer tape to be selectively adhered to said exterior side of said strip of fabric substantially along said second lengthwise edge so that said first and second lengthwise edges overlap one another and are aligned generally parallel to one another to thereby form a tubular configuration for enveloping said linear object, said tubular configuration having a first open end formed along said first widthwise edge and a second open end formed along said second widthwise edge.

2. The device of claim 1, wherein said pressure sensitive adhesive transfer tape is reusable for a limited number of times, such that said cord cover can be opened and reused.

3. The device of claim 1, wherein said pressure sensitive adhesive transfer tape is discontinuous.

4. A system for decoratively covering a linear object, comprising:
    a linear object, said linear object selected from the group consisting of electrical cords, chandelier chains and pipes;

a lengthwise strip of fabric, said lengthwise strip of fabric having a first widthwise edge, a second widthwise edge, a first lengthwise edge, a second lengthwise edge, an interior side and an exterior side, a first elastic strip hemmed along said first lengthwise edge of said strip of fabric, and a second elastic strip hemmed along said second lengthwise edge of said strip of fabric, said first and second elastic strips together providing said strip of fabric with a gathered configuration, and a pressure sensitive adhesive having a base side and a fastening side, said base side of said pressure sensitive adhesive adhered to said strip of fabric, said pressure sensitive adhesive positioned and configured to allow said fastening side of said pressure sensitive adhesive to be selectively adhered to said lengthwise strip of fabric substantially along said second lengthwise edge so that said first and second lengthwise edges overlap one another and are aligned generally parallel to one another to thereby form a tubular configuration, configured to envelope said linear object, said tubular configuration having a first open end formed along said first widthwise edge and a second open end formed along said second widthwise edge.

5. The device of claim 4, wherein said pressure sensitive adhesive is a transfer tape.

6. The device of claim 5, wherein said transfer tape has a removable liner on said fastening side to thereby assist in preserving adhesive properties of said pressure sensitive adhesive.

7. The device of claim 4, wherein said pressure sensitive adhesive is reusable for a limited number of times, such that said cord cover can be opened and reused.

8. The device of claim 4, wherein said pressure sensitive adhesive is discontinuous.

9. A system for decoratively covering a linear object, comprising:

a linear object, said linear object selected from the group consisting of electrical cords, chandelier chains and pipes;

a generally rectangular lengthwise strip of fabric, said lengthwise strip of fabric having a first widthwise edge, a second widthwise edge, a first lengthwise edge, a second lengthwise edge, an interior side and an exterior side, a first elastic strip hemmed along said first lengthwise edge of said strip of fabric, and a second elastic strip hemmed along said second lengthwise edge of said strip of fabric, said first and second elastic strips together providing said strip of fabric with a gathered configuration, a strip of pressure sensitive adhesive transfer tape, said pressure sensitive adhesive transfer tape having a base side and a fastening side, said base side of said pressure sensitive adhesive adhered to said interior side of said strip of fabric substantially along said first lengthwise edge, and a liner, said liner covering said fastening side of said pressure sensitive adhesive transfer tape to thereby assist in preserving adhesive properties of said pressure sensitive adhesive transfer tape, said liner selectively removable from said fastening side of said transfer tape to thereby allow said fastening side of said transfer tape to be selectively adhered to said exterior side of said strip of fabric substantially along said second lengthwise edge so that said first and second lengthwise edges overlap one another and are aligned generally parallel to one another to thereby form a tubular configuration configured to envelope said linear object, said tubular configuration having a first open end formed along said first widthwise edge and a second open end formed along said second widthwise edge.

\* \* \* \* \*